(12) United States Patent
Ness et al.

(10) Patent No.: US 9,770,915 B1
(45) Date of Patent: Sep. 26, 2017

(54) REPLACEABLE ITEM AUTHENTICATION (71) Applicant: Hewlett-Packard Development Company, L.P., Houston, TX (US)

(72) Inventors: Erik D. Ness, Vancouver, WA (US); Stephen D. Panshin, Corvallis, OR (US); Jefferson P. Ward, Brush Prairie, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 15/469,268

(22) Filed: Mar. 24, 2017

Related U.S. Application Data (63) Continuation of application No. PCT/US2016/059118, filed on Oct. 27, 2016.

(51) Int. Cl.
| | |
|---|---|
| *B41J 29/393* | (2006.01) |
| *B41J 2/175* | (2006.01) |
| *G06F 21/44* | (2013.01) |
| *G06F 21/57* | (2013.01) |
| *H04L 9/08* | (2006.01) |
| *H04N 1/44* | (2006.01) |
| *H04L 29/06* | (2006.01) |
| *G06F 21/60* | (2013.01) |

(52) U.S. Cl.
CPC .......... *B41J 2/17546* (2013.01); *G06F 21/44* (2013.01); *G06F 21/57* (2013.01); *H04L 9/0894* (2013.01); *H04N 1/4413* (2013.01); *H04N 1/4426* (2013.01); *H04N 1/4433* (2013.01); *G06F 21/608* (2013.01); *H04L 9/0891* (2013.01); *H04L 63/0876* (2013.01); *H04N 2201/0094* (2013.01)

(58) Field of Classification Search
CPC . B41J 2/17546; H04N 1/4426; H04N 1/4413; H04N 1/4433; H04N 2201/0094; G06F 21/57; G06F 21/44; G06F 21/608; H04L 9/0894; H04L 63/0876; H04L 9/0891
See application file for complete search history.

(56) References Cited

U.S. PATENT DOCUMENTS

| | | | |
|---|---|---|---|
| 7,084,951 | B2 | 8/2006 | Silverbrook |
| 7,788,490 | B2 | 8/2010 | Adkins et al. |
| 8,291,229 | B2 | 10/2012 | Vuillaume et al. |

(Continued)

FOREIGN PATENT DOCUMENTS

| | | |
|---|---|---|
| CN | 105216451 | 1/2016 |
| CN | 105398224 | 3/2016 |
| JP | 2010221680 | 10/2010 |

OTHER PUBLICATIONS

Brother Genuine Supplies Authentication Center, accessed online Sep. 2, 2016, < http://www.brother-usa.com/supplies/security.aspx >.

(Continued)

*Primary Examiner* — Julian Huffman
(74) *Attorney, Agent, or Firm* — Michael A. Dryja (57) ABSTRACT

A replaceable item for a host device includes a non-volatile memory and logic. The non-volatile memory stores passwords or authentication values, and/or a cryptographic key. The logic satisfactorily responds to requests for passwords a maximum permitted number of times to authenticate the replaceable item within the host device.

14 Claims, 5 Drawing Sheets

(56) References Cited

U.S. PATENT DOCUMENTS

| | | | |
|---|---|---|---|
| 9,141,816 B2 | 9/2015 | Refstrup | |
| 9,227,417 B2 | 1/2016 | Ignatchenko et al. | |
| 2011/0286025 A1* | 11/2011 | Silverbrook | B41J 3/445 358/1.14 |
| 2015/0110504 A1* | 4/2015 | Lee | G03G 15/55 399/12 |

OTHER PUBLICATIONS

Xerox Authentication Label: How to Identify Genuine Xerox / Fuji Xerox Supplies, accessed online Sep. 2, 2016, < http://www.fujixerox.com/eng/support/auth_lable/ >.

Ink and Toner Supplies, accessed online Sep. 2, 2016, < http://www8.hp.com/in/en/ads/toner-acf/overview.html >.

* cited by examiner

REPLACEABLE ITEM AUTHENTICATION

BACKGROUND

Devices that use replaceable items include printing devices, including stand-alone printers, copy machines, and all-in-one (AIO) devices that can perform multiple functions, such as printing, copying, scanning, and/or faxing. Example replaceable items for such printing devices include ink, toner, and/or other types of colorant, including two-dimensional (2D) colorant. Other example replacement items, specifically for three-dimensional (3D) printing devices, include 3D printing agent and 3D printing build material.

DETAILED DESCRIPTION

As noted in the background, devices that use replaceable items include printing devices. A supply of print substance, such as colorant or another type of print substance, is stored in a cartridge that can be inserted into a printing device. When the supply becomes depleted, the cartridge can be replaced with a cartridge having a fresh supply of the print substance in question. Cartridges having different types of print substances can also be switched out as desired. As an example, a cartridge having general-purpose ink may be switched out for a cartridge having photo-quality ink within an inkjet-printing device as desired.

Manufacturers of printing devices also typically make or otherwise supply the print substance used in the printing devices. From the end user's perspective, using manufacturer-supplied or manufacturer-approved print substance cartridges can facilitate desired output by the printing devices and/or inhibit damage to the printing devices. For the original equipment manufacturer (OEM) it may be difficult to guarantee printing device output or printing device functioning if the printing device uses third party cartridges. A third party print substance is beyond the control of the OEM. For example, it could provide for different print output or entail a risk of shortening the life of the print device. In some instances, such as 3D printers, there might even be a safety risk to a user when a print substance is a non-approved print substance. In certain instances, usage of non-approved print substance may affect a warranty associated with the printing device.

Manufacturers may therefore instill cartridges with authentication security. A printing device may interrogate the cartridge to determine if it is authentic. If the cartridge is not authentic (e.g., is not OEM approved), then the printing device may initiate a certain procedure, such as, for instance, informing the end user, such as immediately or soon after installation.

Techniques disclosed herein provide a novel, innovative authentication scheme for a print substance cartridge for a printing device, and more generally for a replaceable item for a (host) device in which the item can be installed (i.e., more generally, the device to which the item can be connected). The print substance cartridge stores a number of authentication values, or passwords. The cartridge includes logic (such as circuitry like a processor and memory storing code that the processor executes, firmware, and so on) to satisfactorily respond to requests for these authentication values a predetermined maximum number of times.

As used herein, a response to a request for an authentication value is a satisfactory response if the response includes the requested authentication value. That is, a response to a request for an authentication value is a satisfactory response if the response fulfills the request by including the requested authentication value. A unsatisfactory response to such a request is thus one that does not include the authentication value that has been requested. Therefore, an unsatisfactory response to a request is one that does not fulfill the request, because the response does not include the requested authentication value.

The predetermined maximum number of times that the cartridge will satisfactorily respond to authentication value requests can be considered as the first such number of authentication value requests that the cartridge receives. This is because the cartridge will fulfill authentication value requests as they are received until the maximum number of such requests has been fulfilled. Once the maximum number of authentication value requests has been fulfilled, the cartridge will not fulfill any further authentication value requests.

The predetermined maximum number of times that the cartridge will satisfactorily respond to authentication value requests may be specific to an authentication value. For example, if the cartridge stores sixty-four different authentication values, each authentication value may be returned the predetermined maximum number of times. The predetermined maximum number of times that the cartridge will satisfactorily respond to authentication value requests may be specific to the printing device making the request. For example, the cartridge may satisfactorily respond the predetermined maximum number of times to requests from a first printing device in which the cartridge has been inserted. If the cartridge is removed from this printing device and installed in a second printing device, the cartridge may satisfactorily respond to requests from the second printing device the predetermined maximum number of times as well.

The predetermined maximum number of times that the cartridge will satisfactorily respond to authentication value requests may be specific to both an authentication value and the printing device making the request. For example, if the cartridge stores sixty-four different authentication values, each authentication value may be returned the predetermined maximum number of times to a first printing device in which the cartridge has been inserted. If the cartridge is removed from this printing device and installed in a second printing device, the cartridge may return each authentication value the predetermined maximum number of times to this printing device, too.

The predetermined maximum number of times that the cartridge will satisfactorily respond to authentication value requests may not be specific to an authentication value or to the printing device making the request. The cartridge can, in other words, satisfactorily respond to just a predetermined maximum number of requests regardless of the printing device making the request, or the authentication value that is being requested. Once the cartridge has returned authentication values in response to the predetermined maximum number of requests, the cartridge will no longer return an authentication in response to the next request, even if it is for an authentication value that has not been requested before and even it if is from a printing device that has not requested an authentication value before.

The print substance cartridge can also store hash values of the authentication values, or passwords. The hash values provide a way to determine whether a given authentication value that the cartridge has provided is correct. An authentication scheme using such a print substance cartridge may include a host printing device that might request four different passwords, or authentication values, stored in the cartridge. Different printing devices may and likely will request different passwords from a given cartridge. Similarly, a given printing device may and likely will request different passwords from different cartridges.

Figure 1:
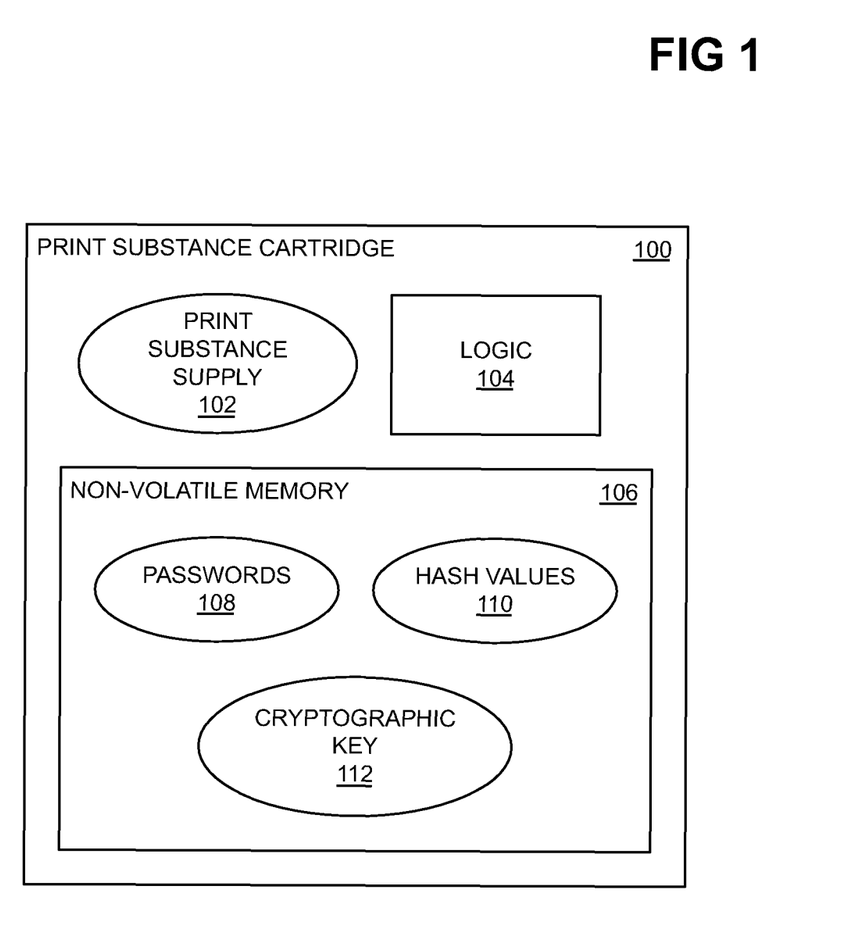
FIG. 1 is a diagram of an example print substance cartridge for a printing device.

FIG. 1 shows an example print substance cartridge 100 for a printing device. The cartridge 100 includes a print substance supply 102. The cartridge 100 may contain any volume of print substance, such as from several milliliters to tens of liters. Different examples of print substance include ink for an inkjet-printing device, and liquid or powder toner for a laser-printing device. Such ink and toner are themselves examples of two-dimensional (2D) colorant, which is colorant used by a suitable printing device to form images on media like paper that minimally if at all extend in a third dimension perpendicular to the two dimensions defining the plane of the surface of the media on which the images have been formed. Other examples of print substance include three-dimensional (3D) printing agent and 3D printing build material, which are used by a suitable 3D printing device to form a 3D object that is typically removable from any substrate on which the object is constructed. Certain print substances, such as ink, may be used for both 2D and 3D printing.

The print substance cartridge 100 includes logic 104. The logic 104 can be implemented as circuitry within the cartridge 100. For example, the logic 104 can include a processor, and a non-volatile computer-readable data storage medium storing computer-executable code that the processor executes. In this respect, then, in one implementation, the logic 104 may include a microprocessor and embedded software stored on the microprocessor itself, where the non-volatile computer-readable data storage medium is integrated within the microprocessor. In another implementation, the logic 104 may include a microprocessor and software embedded within a non-volatile medium separate from the microprocessor.

As another example, the logic 104 can be or include an application-specific integrated circuit (ASIC) or a field-programmable gate array (FPGA). More generally in this respect, the logic 104 can be implemented using logic gates. As a third example, the logic 104 may be implemented as any combination of a processor, software stored within the processor or on a medium separate to the processor, and logic gates.

The print substance cartridge 100 includes non-volatile memory 106. The memory 106 can be semiconductor memory, and is non-volatile in that when power is removed from the cartridge 100, the memory 106 still retains its contents. The memory 106 stores passwords 108, which are also referred to as authentication values herein. The memory 106 can store hash values 110 of, and which can individually correspond to, the passwords 108. The memory 106 can store a cryptographic key 112 from which the passwords 108 are able to be generated.

The memory 106 stores a number of the passwords 108, which is referred to as the total number of passwords 108. The passwords 108, or authentication values, are stored by the cartridge 100 so that the cartridge 100 can prove to a host printing device that it is authentic. Stated another way, the passwords 108 are used to authenticate the cartridge 100 within the printing device. The passwords 108 can be secured in an encrypted cryptographic manner, so that the passwords 108 are essentially irretrievable from the cartridge 100 outside of the approaches described herein. The passwords 108 can each be a series of bits, such as 256 bits.

The memory 106 can store one hash value 110 for each password 108. The hash values 110 are stored by the cartridge 100 so that the cartridge 100 can prove to a host printing device that the passwords 108 are correct. Stated another way, the hash values 110 are used to verify the passwords 108 provided by the cartridge 100 within the printing device. The hash values 110 may not be cryptographically secured in that they are freely retrievable from the cartridge 100, but may be cryptographically secured in that the hash values 110 cannot be modified. The hash values 110 may be one-way hash values 110 of the passwords 108, which means that a password 108 cannot be determined just by knowing its corresponding hash value 110, even if the one-way hash function used to generate the hash value 110 from the password 108 is known.

The hash values 110 can be provided by the cartridge 100 in one implementation in a way so that a host device is able to validate the hash values 110 as having been generated by an entity (i.e., the manufacturer or supplier of the cartridge 100) that the host device trusts. As one example, the hash values 110 may be cryptographically signed with a private cryptographic key prior to storage in the cartridge 100. The host device may use a corresponding public cryptographic key to validate the hash values 110. The private key may not be stored on the cartridge 100, and is unavailable publicly.

The logic 104 permits retrieval of the passwords a predetermined maximum number of times. The logic 104 can permit retrieval of a predetermined maximum number of the passwords 108, less than the total number of the passwords 108 stored in the non-volatile memory 106. In such an implementation, the logic 104 prohibits retrieval of any password 108 other than the predetermined maximum number of passwords, even one time, from the memory 106. Such an implementation is described in the copending patent application filed on Jun. 16, 2016, and assigned patent application number PCT/US2016/38211, which is hereby incorporated by reference.

The logic 104 can permit retrieval of the passwords 108 a predetermined maximum number of times, regardless of the passwords 108 that are requested. That is, the logic 104 satisfactorily responds to the first predetermined maximum number of requests for the passwords 108, regardless of the passwords 108 within those requests, and does not return passwords 108 in response to subsequently received requests for the passwords 108. The predetermined maximum number of requests for the passwords 108 to which the logic 104 will satisfactorily respond can be less than, equal to, or greater than the number of the passwords 108. If the predetermined maximum number of requests is less than the number of the passwords 108, the logic 104 will never return one or more of the passwords 108. If the predetermined maximum number is equal to or greater than the number of the passwords 108, the logic 104 can potentially return all the passwords 108, but depending on the passwords 108 requested in the first predetermined maximum number of requests, may not ever return one or more of the passwords 108.

The logic 104 can permit retrieval of the passwords 108 a predetermined maximum number of times, on a per-password basis. That is, the logic 104 satisfactorily responds to the first predetermined maximum number of requests for each password 108. For example, if there are sixty-four passwords 108, the logic 104 will return the first password 108 the predetermined maximum number of times, the second password 108 the predetermined maximum number of times, and so on.

The logic 104 can permit retrieval of the passwords 108 a predetermined maximum number of times, regardless of the host printing device that made the requests. That is, the logic 104 satisfactorily responds to the first predetermined maximum number of requests for the passwords 108, regardless of the host printing device from which each such request was received, and does not return passwords 108 in response to subsequently received requests for the passwords 108. For example, the predetermined maximum number of times the logic 104 returns the passwords 108 may be one hundred. If the logic 104 is installed in a first host printing device from which one hundred requests are received, the logic 104 will not satisfactorily respond to any further request received from this printing device. Furthermore, if the cartridge 100 is then removed from the first printing device and installed in another, second host printing device, the logic 104 will still not satisfactorily respond to any request received from the second printing device.

The logic 104 can permit retrieval of the passwords a predetermined maximum number of times, on a per-host printing device basis. That is, the logic 104 satisfactorily responds to the first predetermined maximum number of requests that it receives from each printing device. For example, the predetermined maximum number of times the logic 104 returns the passwords 108 may be one hundred. The logic 104 may be installed in a first host printing device from which fifty requests are received and to which the logic 104 satisfactorily responds. If the cartridge 100 is then removed from the first printing device and installed in another, second host printing device, the logic 104 will still satisfactorily respond to the first one-hundred requests received from the second printing device.

The logic 104 can permit retrieval of the passwords 108 a predetermined maximum number of times, regardless of the passwords 108 that are requested and regardless of the host printing device that made the requests. That is, which password 108 was requested in a request and which host printing device made the request do not matter as to whether the logic 104 will satisfactorily respond to the request. Once the logic 104 has satisfactorily responded to the predetermined maximum number of such requests, irrespective of the host printing device that makes the next request or the password 108 requested in this request, the logic 104 does not return the requested password 108 to the requesting printing device.

The logic 104 can permit retrieval of the passwords 108 a predetermined maximum number of times, on both a per-host printing device basis and a per-password basis. The logic 104 can return each password 108 to every printing device the predetermined maximum number of times. Once a host printing device has received a given password 108 the predetermined maximum number of times, the printing device may still receive other passwords 108 from the logic 104, and another host printing device can still receive the given password.

The non-volatile memory 106 used for the storage of the passwords 108 can be a write-once, read-limited memory. The passwords 108 are written to the memory 106 just once, such as during a secure manufacturing process. The passwords 108 can be at least functionally erased once the predetermined maximum number of times has been reached. They may be completely and indelibly erased from the memory 108 by the logic 104, for instance, in a manner so that "unerasing" or the recovery of the erased passwords 108 is considered impossible. The passwords 108 in question may be functionally erased in that these passwords 108 remain stored in the memory 108, but are irretrievable. For example, fuse links to the physical parts of the memory 108 where the passwords 108 in question are stored may be severed, rendering the passwords 108 irretrievable and thus functionally erased even though in actuality the passwords 108 remain in memory.

The memory 106 can store the cryptographic key 112 in lieu of the passwords 108 when the cartridge 100 is manufactured. In this implementation, prior to first usage of the cartridge 100, no passwords 108 may be stored in the cartridge 100. Rather, when a password 108 is requested, the cartridge 100 generates the password 108 "on the fly." Once the logic 104 has satisfactorily responded to the predetermined maximum number of requests, the cryptographic key 112 may be at least functionally erased, in the manner described in the previous paragraph.

Figure 2:
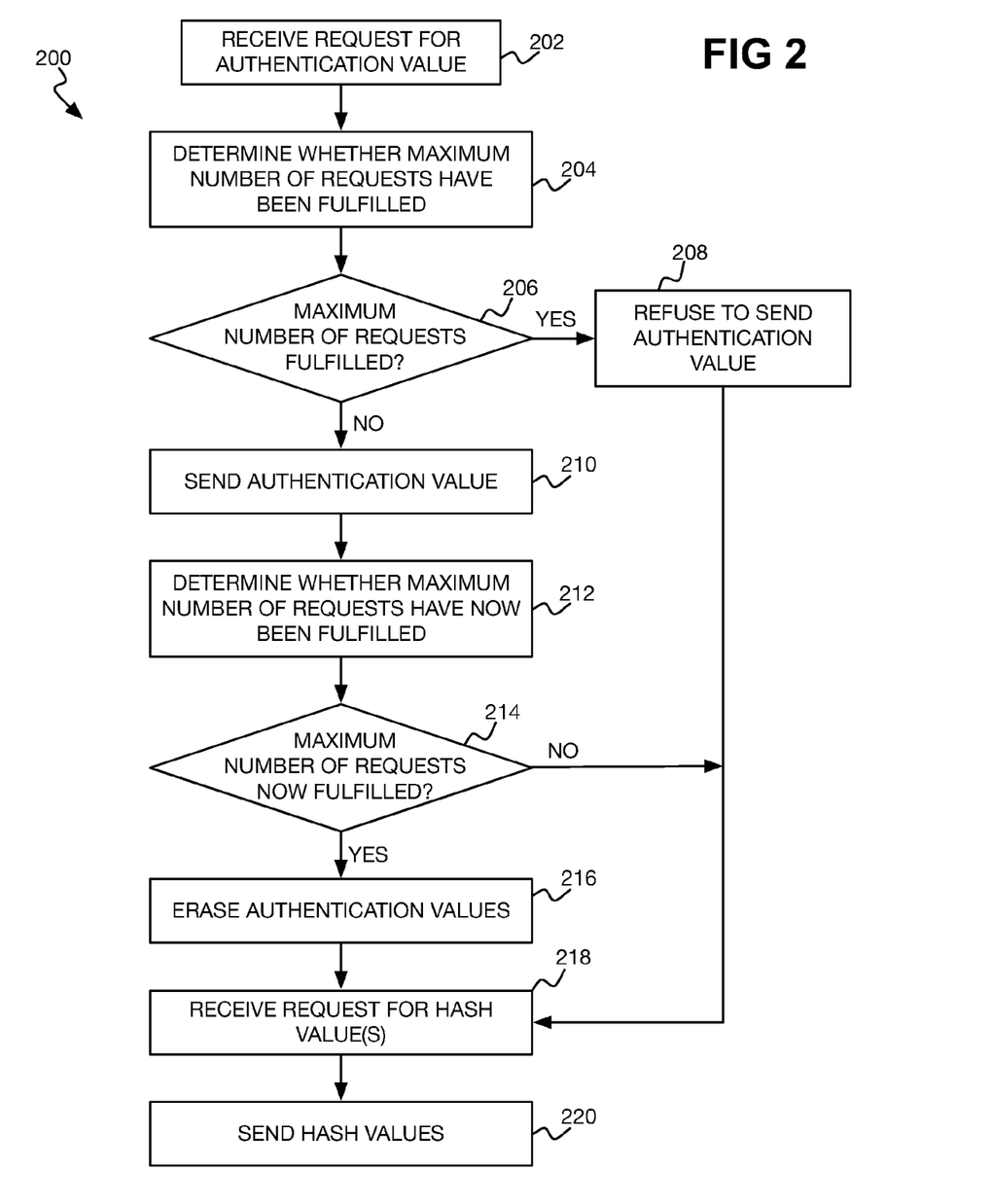
FIG. 2 is a flowchart of an example method that a print substance cartridge or other replaceable item for a device can perform.

FIG. 2 shows an example method 200 that a replaceable item for a device, such as the print substance cartridge 100 for a printing device, can perform. The method 200 can be implemented as computer-readable code stored on a non-transitory computer-readable data storage medium and that a processor executes. As such, the logic 104 of the cartridge 100 can perform the method 200, for example. The replaceable item performs the method 200 once it has been installed in a host device.

The replaceable item receives a request from the host device for a particular authentication value of a number of authentication values that the item may store (202). The request may be signed with a digital cryptographic key, or may be authenticated in another manner. The replaceable item determines whether it has already fulfilled a predetermined maximum number of requests for authentication values (204). The predetermined maximum number of requests to which the replaceable item will satisfactorily respond can be on a per-authentication value and/or a per-host device basis, or on neither a per-authentication value basis nor a per-host device basis.

If the predetermined maximum number of requests has already been fulfilled (206), then the replaceable item does not send the requested authentication value to the host device in which the item is installed (208). However, if the replaceable item has not yet satisfactorily responded to the predetermined maximum number of requests, then the item sends the requested authentication value to the host device (210). For instance, the replaceable item may retrieve the requested authentication value from a table of the authentication values stored within non-volatile memory of the replaceable item. As another example, the replaceable item may retrieve a seed value stored within non-volatile memory of the replaceable item (different than that with which the received request may have been signed), and generate the requested authentication value from the cryptographic key.

The replaceable item can again determine whether the item has now satisfactorily responded to the maximum number of requests (212), including the request received in part 202 that has been fulfilled. If the predetermined maximum number of requests has now been fulfilled (214), then the replaceable item may at least functionally erase the authentication values that it stores (216). If the predetermined maximum number of requests is on a per-authentication value basis but not on a per-host device basis, then just the authentication value that was sent in part 210 is erased, and other authentication values are not erased. If the predetermined maximum number of requests is on a per-host device basis, regardless of whether this number is on a per-authentication value basis or not, then no authentication value may be erased, because other host devices may request the same (or another) authentication value.

In an implementation in which the replaceable item generates authentication values from a cryptographic key, erasure of the authentication values in part 212 means or includes erasure of this key. If the predetermined maximum number of requests is on a per-authentication value basis but not on a per-host device basis, then the cryptographic key does not occur until the predetermined maximum number of requests has been received for all the authentication values. If the predetermined maximum number of requests is on a per-host device, regardless of whether this number is on a per-authentication value basis or not, then the cryptographic key may not be erased, because authentication values may have to be generated for other host devices.

In one implementation, the authentication value may not be sent until whether erasure will be performed is determined—and further if it is determined that erasure of the authentication value will be performed, the authentication value may be erased from non-volatile memory until prior to sending the authentication value. That is, after the replaceable item determines that the maximum number of requests have not yet been fulfilled in part 206, the replaceable item then determines whether the maximum number of requests will be fulfilled with the fulfillment of the requested received in part 202. If the maximum number of requests will still not be fulfilled with fulfillment of the received request, then the replaceable item sends the authentication value and proceeds. If the maximum number of requests will be fulfilled with the fulfillment of the received request, then the replaceable item copies the requested authentication value from non-volatile memory before erasing at least this authentication value from non-volatile memory, and then sends the copied authentication value to the host device.

From parts 208 and 216, and from part 214 when the maximum number of requests have not yet been fulfilled, or as an entry point to the method 200, the replaceable item can receive from the host device a request for one or more hash values corresponding to one or more authentication values (218). For example, the replaceable item may receive a request for all the hash values corresponding to all the authentication values, for just one of the hash values corresponding to just one of the authentication values, and so on. The replaceable item may receive a request for one or more hash values even after the authentication values are erased in part 216. That is, the replaceable item may not erase the hash values for the authentication values that it erases, for instance. Part 218 can be considered as an entry point to the method 200 in that the request for the hash values can be received prior to receipt of a request for an authentication value.

Figure 3:
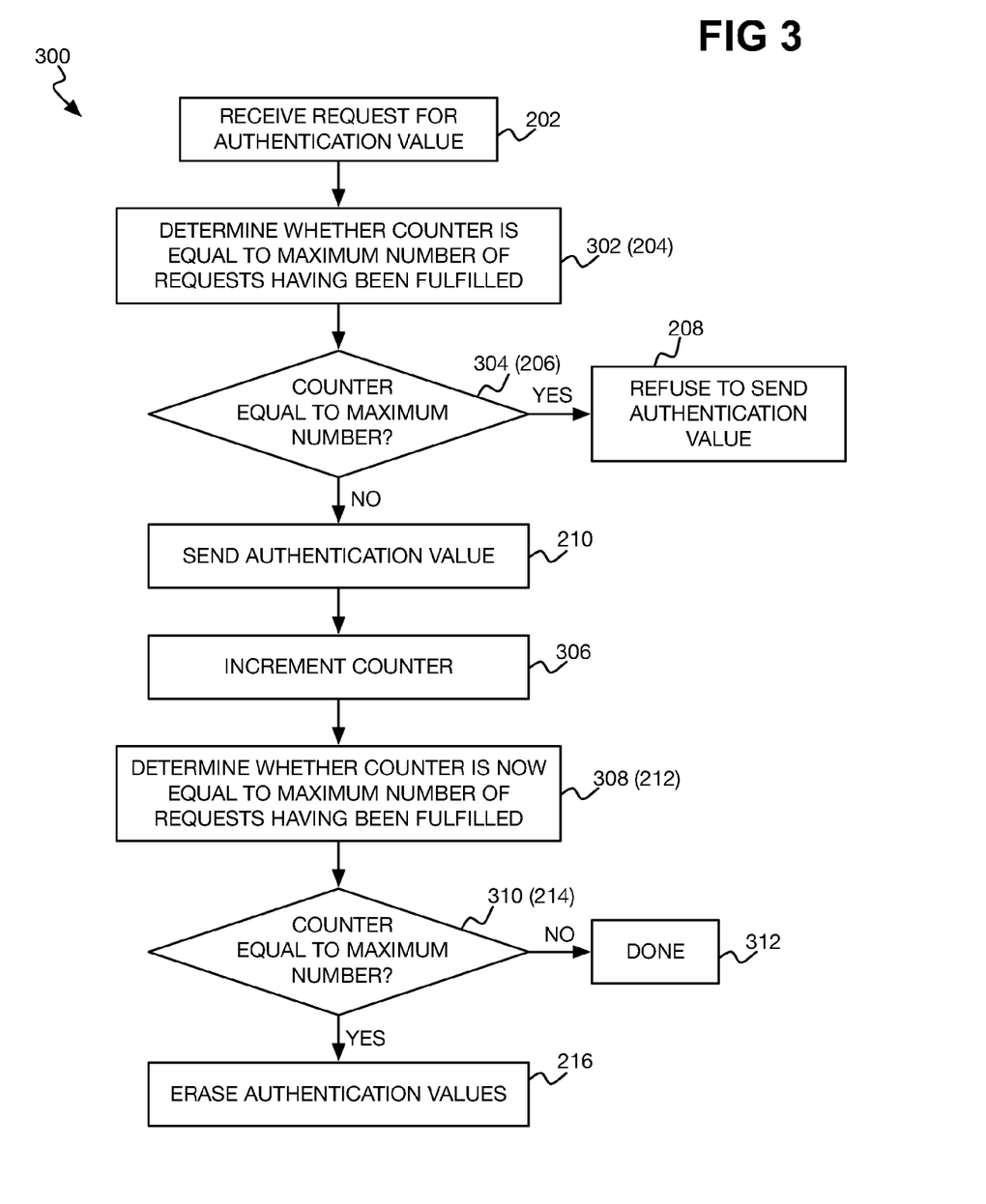
FIG. 3 is a flowchart of an example method that a print substance cartridge or other replaceable item for a device can perform to implement a portion of the method of FIG. 2.

FIG. 3 shows an example method 300 that is an example of a particular implementation of parts 202 through 216 of the method 200. Identically numbered parts in FIGS. 2 and 3 are performed in the method 300 at least substantially as described above in relation to the method 200. Numbers in parentheses indicate that a given part of the method 300 is implementing a corresponding part of the method 200. That is, Y(X) in FIG. 3 means that part Y of the method 300 is implementing part X of the method 200.

The replaceable item receives a request for an authentication value from the host device in which it is installed (202). The replaceable item maintains a counter of the number of authentication value requests that have been fulfilled. That is, the replaceable item maintains a counter of the number of authentication value requests to which it has satisfactorily responded. The counter can be an increment-only counter, which can be increased and not decreased. The counter is stored in non-volatile memory, such as the non-volatile memory 106, and can be secured.

The replaceable item determines whether the counter is equal to the predetermined maximum number of requests to which the item has satisfactorily responded to fulfill the requests (302). There may be a counter on a per-authentication value basis and/or a per-host device basis, or on neither a per-authentication value basis nor a per-host device basis. If the counter is equal to this predetermined maximum number (304), then the replaceable item refuses to send the requested authentication value (208).

If the counter is not equal to the predetermined maximum number of requests in which the replaceable item has satisfactorily responded (304), however, then the replaceable item sends the authentication value to the host device in response to and to fulfill the request (210). The replaceable item increments the counter (306), and determines whether the counter is now equal to the predetermined maximum number of requests that the item will fulfill (308). If the counter is not yet equal to this maximum number (310), then the method 300 is finished (312). However, if the counter is now equal to this number (310), then the replaceable item can erase the authentication values (216).

In a different implementation, the counter is incremented prior to sending the authentication value. That is, in this implementation, it is determined whether the maximum number of authentications will have now been sent with the sending of an authentication value, and if so, then the counter is incremented, and after the counter has been incremented, the authentication value is sent. Erasure of the authentication values, if any, can occur in this implementation prior to sending the authentication value in question. More generally, any action that is performed due to the sending of the last unique authentication value that will be provided by the replaceable item, can be performed prior to sending this last unique authentication value. It is noted in this respect that, more generally still, any such action that is performed in conjunction with sending an authentication value (and not the last authentication value) can be performed prior to the authentication value actually being sent.

Figure 4:
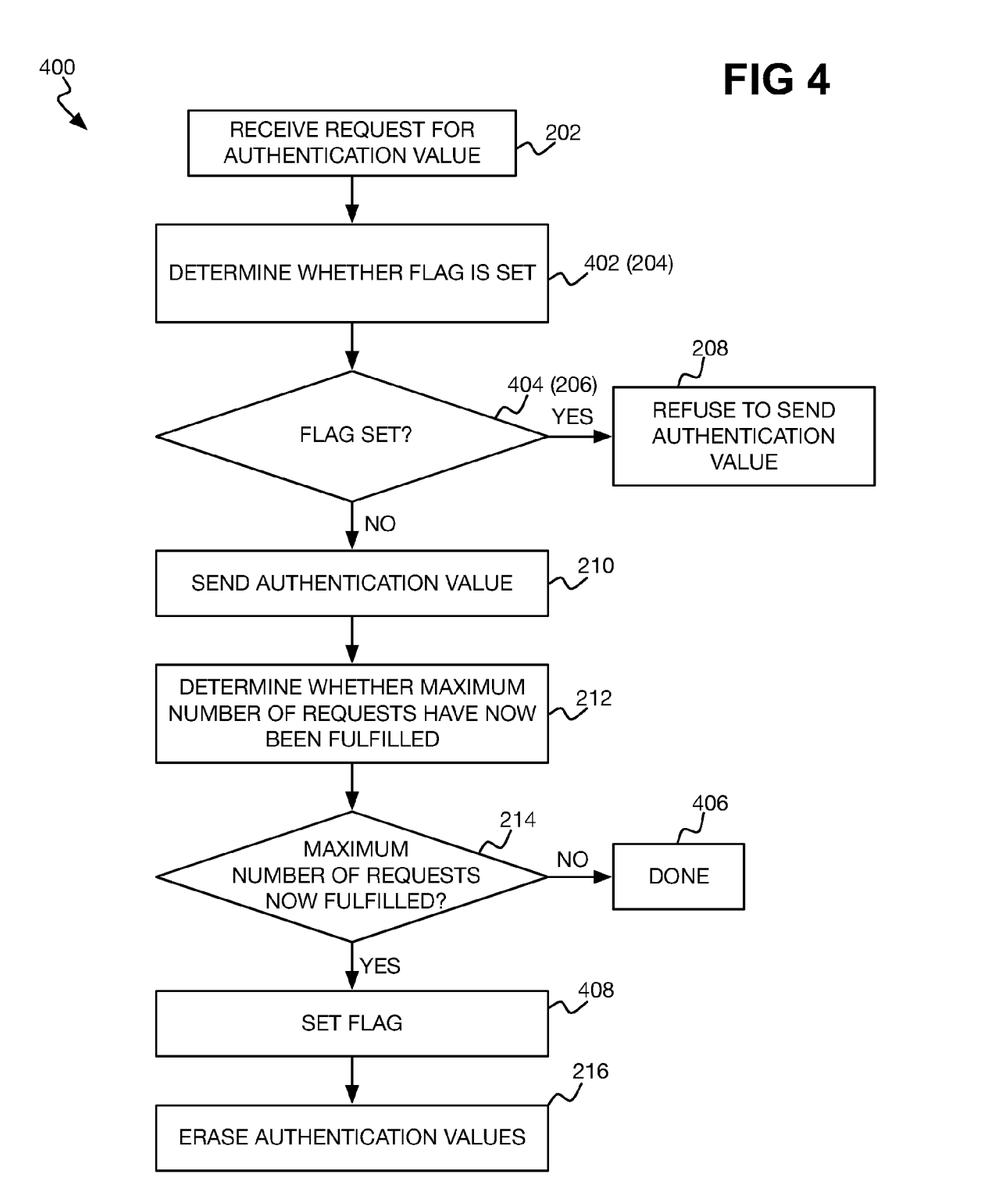
FIG. 4 is a flowchart of another example method that a print substance cartridge or other replaceable item for a device can perform to implement a portion of the method of FIG. 2.

FIG. 4 shows an example method 400 that is another example of a particular implementation of parts 202 through 216 of the method 200. Identically numbered parts in FIGS. 2 and 4 are performed in the method 400 at least substantially as described above in relation to the method 200. Numbers in parentheses indicate that a given part of the method 400 is implementing a corresponding part of the method 200. That is, Y(X) in FIG. 4 means that part Y of the method 400 is implementing part X of the method 200.

The replaceable item receives a request for an authentication value from the host device in which it is installed (202). The replaceable item maintains a flag corresponding to whether the predetermined maximum number of authentication value requests has been fulfilled by the replaceable item satisfactorily responding thereto. The flag can be a settable-only flag, which can be set but which cannot be cleared. The flag is stored in non-volatile memory, such as the non-volatile memory 106, and can be secured.

The replaceable item determines whether the flag has been set (402). There may be a flag on a per-authentication value basis and/or a per-host device basis, or on neither a per-authentication value basis nor a per-host device basis. If the flag has been set (404), then the replaceable item refuses to send the requested authentication value (208).

If the flag has not been sent (404), however, then the replaceable item sends the authentication value to the host device in response to and to fulfill the request (210). The replaceable item determines whether the maximum number of requests to which it will satisfactorily respond has now been fulfilled (212). If the replaceable item has not yet satisfactorily responded to the maximum number of authentication value requests (214), then the method 400 is finished (404). However, if the replaceable item has fulfilled the maximum number of such requests (214), then the replaceable item sets the flag (408), and can erase the authentication values (216).

In a different implementation, the flag is set prior to sending the authentication value. That is, in this implementation, it is determined whether the maximum number of authentications will have now been sent with the sending of an authentication value, and if so, then the flag is set, and after the flag has been set, the authentication value is sent. Erasure of the authentication values, if any, can occur in this implementation prior to sending the authentication value in question. More generally, any action that is performed due to the sending of the last unique authentication value that will be provided by the replaceable item, can be performed prior to sending this last unique authentication value. It is noted in this respect that, more generally still, any such action that is performed in conjunction with sending an authentication value (and not the last authentication value) can be performed prior to the authentication value actually being sent.

Figure 5:
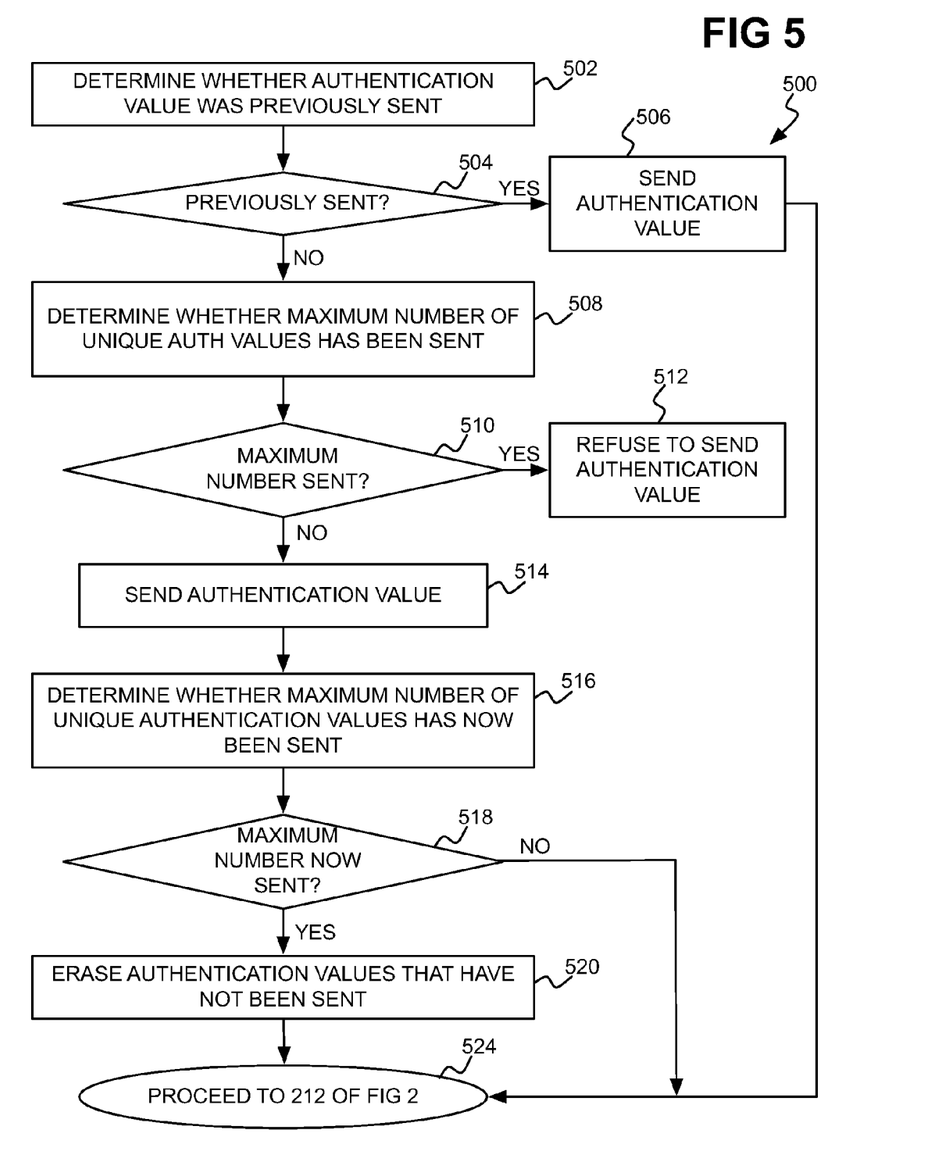
FIG. 5 is a flowchart of an example method that a print substance cartridge or other replaceable item for a device can perform to implement a part of the method of FIG. 2.

FIG. 5 shows an example method 500 that an example of an implementation of part 210 of the method 200. That is, in lieu of sending the authentication value automatically in part 210 of the method 200, a replaceable item performs the method 500. The replaceable item determines whether it has previously sent the authentication value that has been requested by a host device in the request the item received from the device to any host device (502), including the host device in which the item is currently installed, as well as any other host device. If the replaceable item has previously sent the requested authentication value (504), the item returns the requested value to the host device (506).

However, if the replaceable item has not previously sent the requested authentication value (504), the item determines whether it has already sent the maximum number of unique authentication values (508). For example, of sixty-four authentication values that the replaceable item may store, the item may send no more than sixteen of these values. If the replacement item has already sent the maximum number of unique authentication values (510), the item does not send the authentication value that the host device in which the item is installed has requested (512). The method 500 is finished with the replaceable item not sending the requested authentication value, even if the maximum number of requests that the replaceable item will satisfactorily respond to has not been reached yet.

However, if the replaceable item has not yet sent the maximum number of unique authentication values, then the item sends the requested authentication value to the host device (514). The replaceable item then can again determine whether the maximum number of authentication values has now been sent (516), including the authentication value that the item just sent in part 514. For example, if the item is permitted to send just sixteen of its sixty-four authentication values, if fifteen values were sent prior to performance of part 514, then a different, sixteenth authentication value is sent in part 514, such that the maximum number of sixteen different authentication values has now been sent.

If the maximum number of unique authentication values has now been sent (518), then the replaceable item can at least functionally erase the authentication values that it stores and that have not been sent (520). As such, in the ongoing example, once sixteen different authentication values have been sent, the other forty-eight authentication values are erased. Note that each time the method 500 of FIG. 5 is performed, then, the replaceable item can send any authentication value that it sent previously up to the permitted maximum number of times that the item will satisfactorily respond to authentication value requests. Furthermore, each time the method 500 is performed, the replaceable item can send any authentication value that it has not sent previously so long as the maximum number of different authentication values that the item will send has not yet been reached, up to the permitted maximum number of times that the item will satisfactorily respond to authentication value requests. From parts 506 and 520, and from part 518 when the maximum number of unique sent authentication values has not yet been reached, the method 500 proceeds to part 212 of the method 200 of FIG. 2 (524).

The different implementations of parts of the method 200 that have been described in relation to the methods 300, 400 and 500 can be combined or modified in different ways. For example, the counter of the method 300 can be used in conjunction with the flag of the method 400. The method 500 can be used in conjunction with the method 300 and/or the method 400 as well.

The techniques disclosed herein may improve, or provide for another scheme for, cryptographic security of a replaceable item for a device, such as a print supply cartridge for a printing device. A replaceable item satisfactorily responds to a predetermined maximum number of authentication value requests. Once the maximum number of authentication requests has been received, additionally received requests will not be honored, even if they remain stored in the replaceable item. The predetermined maximum number of requests to which the replaceable item will satisfactorily respond can be on a per-authentication value and/or a per-host device basis, or on neither a per-authentication value basis nor a per-host device basis.

We claim:

1. A non-transitory computer-readable data storage medium storing computer-executable code executable by a replaceable item to perform a method comprising:

in response to receiving a request for an authentication value of a plurality of authentication values of the replaceable item from a host device to which the replaceable item has been connected, determining whether the replaceable item has already satisfactorily responded to authentication value requests a maximum permitted number of times;

in response to determining that the replaceable item has already satisfactorily responded to authentication value requests the maximum permitted number of times, refusing to send the requested authentication value to the host device; and in response to determining that the replacement item has not yet already satisfactorily responded to authentication value requests the maximum permitted number of times, sending the requested authentication value to the host device.

2. The non-transitory computer-readable data storage medium of claim 1, wherein determining whether the replaceable item has already satisfactorily responded to authentication value requests the maximum permitted number of times comprises:

determining whether the replacement item has already satisfactorily responded to authentication value requests the maximum permitted number of times without regards to which of the authentication values were requested in the authentication value requests.

3. The non-transitory computer-readable data storage medium of claim 1, wherein determining whether the replaceable item has already satisfactorily responded to authentication value requests the maximum permitted number of times comprises:

determining whether the replacement item has already satisfactorily responded to authentication value requests for the requested authentication value the maximum permitted number of times.

4. The non-transitory computer-readable data storage medium of claim 1, wherein determining whether the replaceable item has already satisfactorily responded to authentication value requests the maximum permitted number of times comprises:

determining whether the replacement item has already satisfactorily responded to authentication value requests the maximum permitted number of times without regards to which host devices sent the authentication value requests.

5. The non-transitory computer-readable data storage medium of claim 1, wherein determining whether the replaceable item has already satisfactorily responded to authentication value requests the maximum permitted number of times comprises:

determining whether the replacement item has already satisfactorily responded to authentication value requests from the host device the maximum permitted number of times.

6. The non-transitory computer-readable data storage medium of claim 1, wherein determining whether the replaceable item has already satisfactorily responded to authentication value requests the maximum permitted number of times comprises:

determining whether the replacement item has already satisfactorily responded to authentication value requests the maximum permitted number of times without regards to which of the authentication values were requested in the authentication value requests and without regards to which host devices sent the authentication value requests.

7. The non-transitory computer-readable data storage medium of claim 1, wherein determining whether the replaceable item has already satisfactorily responded to authentication value requests the maximum permitted number of times comprises:

determining whether the replacement item has already satisfactorily responded to authentication value requests for the requested authentication value from the host device the maximum permitted number of times.

8. The non-transitory computer-readable data storage medium of claim 1, wherein determining whether the replaceable item has already satisfactorily responded to authentication value requests the maximum permitted number of times comprises:

determining whether a counter of a number of times the replacement item has already satisfactorily responded to authentication value requests is equal to the maximum permitted number of times, and wherein the method further comprises, in response to determining that the replaceable item has not yet already responded to authentication value requests the maximum permitted number of times, incrementing the counter.

9. The non-transitory computer-readable data storage medium of claim 1, wherein determining whether the replaceable item has already satisfactorily responded to authentication value requests the maximum permitted number of times comprises:

determining whether a flag corresponding to the replaceable item having already responded to authentication value requests the maximum permitted number of times has been set, and wherein the method further comprises, in response to determining that the replaceable item has not yet already responded to authentication value requests the maximum permitted number of times:

determining whether the replaceable item has now or will have now responded to authentication value requests the maximum permitted number of times;

in response to determining that the replaceable item has now or will have now responded to authentication value requests the maximum permitted number of times, setting the flag.

10. The non-transitory computer-readable data storage medium of claim 1, wherein sending the authentication value comprises retrieving the requested authentication value from a table of the authentication values stored within the replaceable item, and wherein the method further comprises, in response to determining that the replaceable item has not yet already responded to authentication value requests the maximum permitted number of times:

determining whether the replaceable item has now or will have now responded to authentication value requests the maximum permitted number of times;

in response to determining that the replaceable item has now or will have now responded to authentication value requests the maximum permitted number of times, functionally erasing the authentication values from the replaceable item.

11. The non-transitory computer-readable data storage medium of claim 1, wherein sending the authentication value comprises generating the requested authentication value from a cryptographic key stored within the replaceable item, and wherein the method further comprises, in response to determining that the replaceable item has not yet already responded to authentication value requests the maximum permitted number of times:

determining whether the replaceable item has now or will have now responded to authentication value requests the maximum permitted number of times;

in response to determining that the replaceable item has now or will have now responded to authentication value requests the maximum permitted number of times, functionally erasing the cryptographic key from the replaceable item.

12. The non-transitory computer-readable data storage medium of claim 1, wherein the request is a first request, and the method further comprises:
receiving a second request from the host device, for a one-way hash value of the authentication value; and
sending the one-way hash value to the host device,
wherein the first request is received prior to or after the second request is received.

13. The non-transitory computer-readable data storage medium of claim 1, wherein sending the requested authentication value to the host device comprises:
determining whether the replaceable item previously sent the requested authentication value;
in response to determining that the requested authentication value was previously sent, proceeding to send the requested authentication value to the host device;
in response to determining that the requested authentication value was not previously sent, determining whether the replaceable item previously sent a maximum number of unique authentication values of the authentication values, the maximum number of unique authentication values less than a total number of the authentication values;
in response to determining that the maximum number of unique authentication values has not been sent, sending the requested authentication value to the host device; and
in response to determining that the maximum number of unique authentication values has been sent, refusing to send the requested authentication value to the host device.

14. The non-transitory computer-readable data storage medium of claim 1, wherein the host device is a printing device, and the replaceable item is a print substance cartridge for the printing device.

* * * * *